Inventor
Robert J. Willis, Jr
by W. C. Crutcher
His Attorney

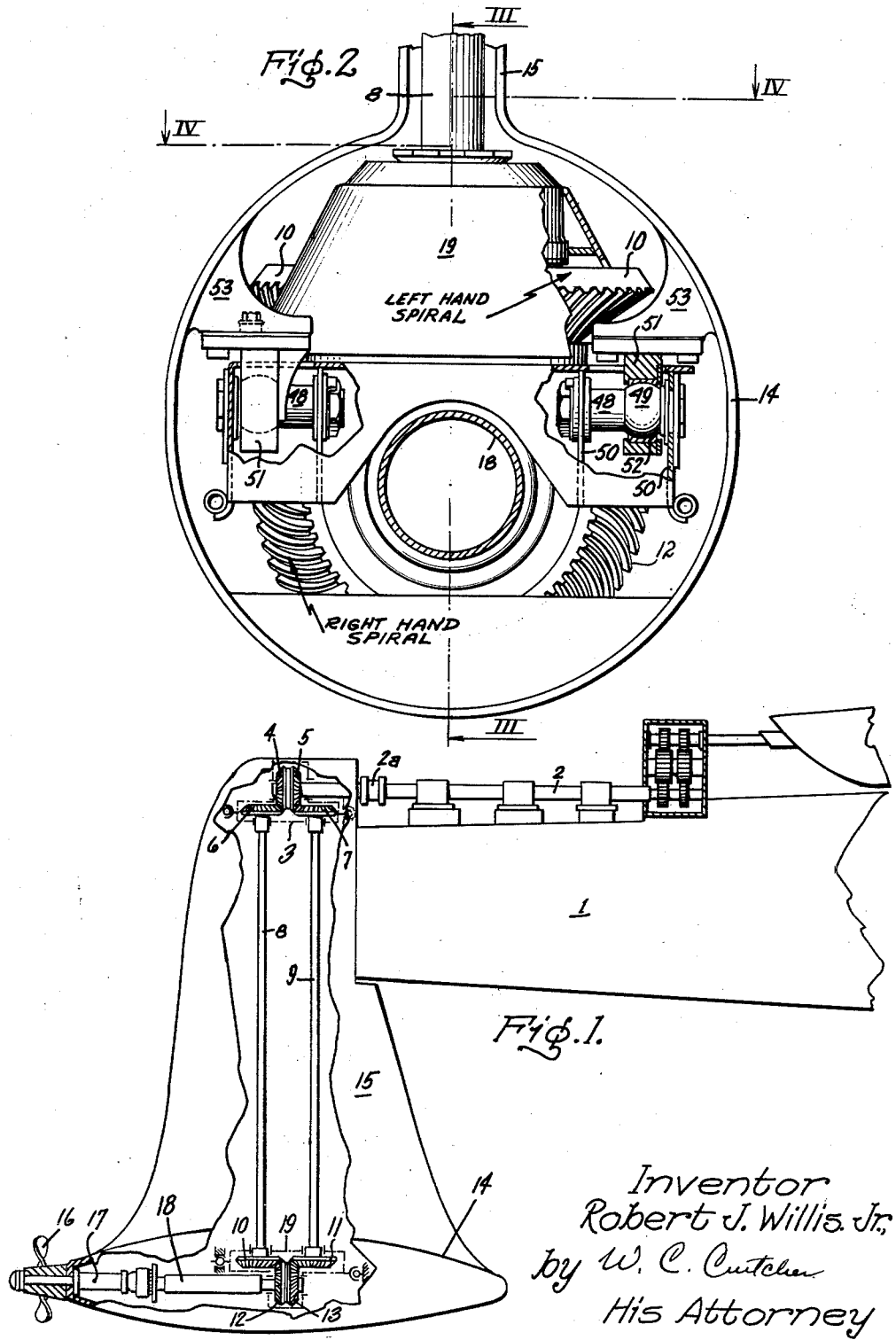

Nov. 19, 1963  R. J. WILLIS, JR  3,111,111
BEVEL GEAR DRIVE
Filed Oct. 26, 1961  3 Sheets-Sheet 3

Inventor
Robert J. Willis, Jr.,
by W. C. Crutcher,
His Attorney

3,111,111
BEVEL GEAR DRIVE
Robert J. Willis, Jr., Nahant, Mass., assignor to General
Electric Company, a corporation of New York
Filed Oct. 26, 1961, Ser. No. 147,855
1 Claim. (Cl. 115—34)

This invention relates to an improved arrangement of spiral bevel gearing for reducing the axial thrust reactions in the gearing, and more particularly it relates to an improved spiral bevel gear arrangement suitable for transmitting power to the propeller shaft of a hydrofoil boat.

It is well known that bevel gears introduce axial thrust loads on the gear shafting because of the angle between shafts. This necessitates the use of thrust bearings to counteract these undesirable loads.

Bevel gearing is more commonly of the spiral type when high power at high speed is to be transmitted, because of the greater gear tooth contact afforded. One of the normal characteristics of spiral bevel gearing is that one of the mating gears experiences a thrust in a direction tending to drive the gear teeth more tightly into mesh, while the other of the mating gears experiences a thrust tending to drive the gear teeth out of mesh. This is because of the additive and subtractive effect of the spiral angle on the respective gears. Suitable means must be provided to counteract these thrust loads and keep the teeth in proper relationship. Assembly in a rigid mounting is also essential to the proper operation of spiral bevel gears.

In a hydrofoil vessel, the propeller for driving the vessel when it is elevated on the hydrofoil planes is mounted on a horizontal shaft at a considerable distance below the vessel. Physical considerations for the powerplant also favor a horizontal drive shaft operated by a prime mover, and therefore bevel gear drives have been suggested for transmitting power to the propeller shaft located in a separate "pod" beneath the surface of the water. The aforementioned characteristics of bevel gearing, however, and the necessity for proper alignment of the gears, while allowing for the flexing of the pod with respect to the gearing, have caused considerable difficulty in using this approach.

Accordingly, one object of the present invention is to provide an improved bevel gear arrangement for transmitting power along parallel shafts with minimum thrust loads on the respective shafts.

Another object of the invention is to provide an improved spiral bevel gear drive for a hydrofoil propeller pod.

Still another object of the invention is a spiral bevel gear configuration and a mounting therefor which holds the gear teeth in alignment despite external forces on the gear mounting.

Yet another object of the invention is a spiral bevel gear arrangement wherein the reactions of the gears on the associated bearings are reduced to a minimum.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIG. 1 is a horizontal elevation drawing, in diagrammatic form, of the gearing arrangement for a hydrofoil vessel drive;

FIG. 2 is an enlarged end view, partly in section, of the propeller pod for the vessel of FIG. 1;

Figure 3:
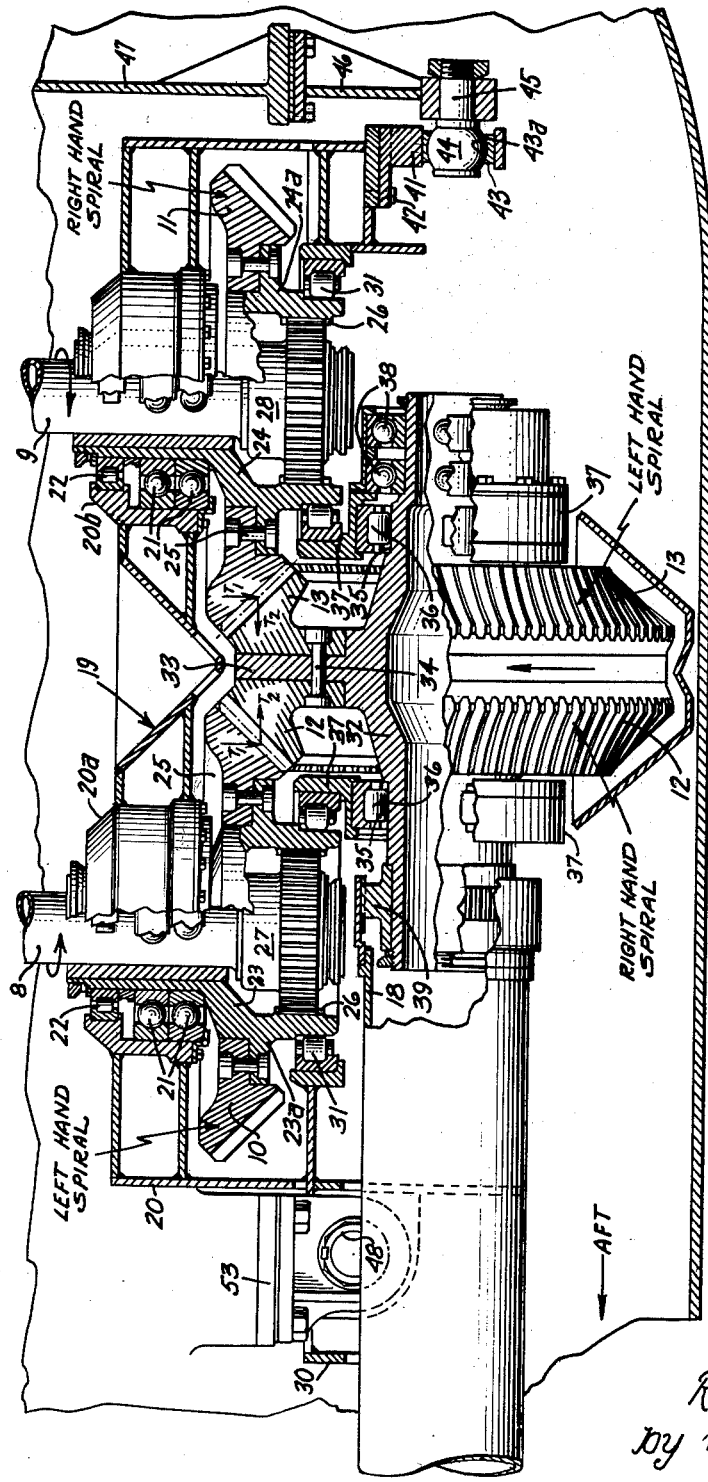
FIG. 3 is an enlarged elevation view, partly in section, of the bevel gear arrangement in the pod taken along lines III—III of FIG. 2.

Briefly stated, the invention is practiced by employing two bevel gears mounted on the same shaft with opposed counterbalancing thrusts and employing two additional shafts with bevel gears, each mating with one of the opposed bevel gears. The direction of spiral, the direction of rotation, and particularly the value of the spiral angle are selected with respect to the other variables, so as to reduce or substantially eliminate thrust and radial reactions on the shafts. The gear box supporting the spiral bevel gears is held in a three-point support which divorces distortions in the pod from the gear housing. Thus there are no deflections in the gear housing which would disturb the alignment of the gear teeth.

Referring to FIG. 1 of the drawing, the stern of a hydrofoil vessel 1 is shown fitted with a horizontal drive shaft 2. Drive shaft 2 is connected through a coupling 2a to a gear box 3 so as to turn bevel pinion gears 4, 5 mounted back-to-back. Upper bevel gears 6, 7, mating with pinion bevel gears 4, 5 respectively, are mounted on parallel vertical hubs. Parallel vertical shafts 8, 9 are coupled to the hubs of bevel gears 6, 7 in the upper bevel gear box 3 and to the hubs of bevel pinion gears 10, 11 respectively in the pod bevel gear box 19. Lower bevel pinion gears 10, 11 drive bevel gears 12, 13 mounted back-to-back in the manner of gears 4, 5 above. The bevel gear boxes 3, 19 are shown by dot-dash lines in the diagrammatic view of FIG. 1, but the details of the gear boxes and pivotable 3-point mountings therefor will be described in detail in connection with the pod bevel gear box 19.

Pod 14 is supported a considerable distance below the keel of vessel 1 by means of a strut 15. Strut 15 has a substantial length in the vertical direction, and is very thin in the transverse direction (see FIG. 2), so as to fit closely about shafts 8, 9 in order to reduce resistance to the water. The driven bevel gears 12, 13 furnish propulsion power to a propeller 16 mounted on a propeller shaft 17 and driven through flexible couplings including a torque tube 18.

Referring to FIG. 2, of the drawing, which is an axial view of the propeller pod 14, it can be seen that the twin spiral bevel gear set comprising gears 10, 11, 12 and 13 is held in place by a gear box 19, which in turn is supported within pod 14 in a manner later to be described in detail.

A better understanding of the details of gear box 19 may be had by reference to the elevation drawing of FIG. 3, where the lower bevel gears 10–13, together with the gear box 19 and mounting therefor, may be seen. There it may be seen that the shafts 8, 9 are coupled to gear hubs 23 and 24 respectively. The hubs 23, 24 are mounted in an upper housing 20 which holds two fixed bearing housings 20a, 20b. In each of these housings is disposed a double set of rolling element ball bearings 21 mounted back-to-back for axial rigidity, and an additional set of roller bearings 22. Journaled in bearings 21, 22 are the gear hubs 23, 24 adapted with external flanges 23a, 24a for securing to gear rims 10, 11 respectively in a suitable manner, such as by bolts 25. Hubs 23, 24 are fitted with internal spline teeth 26 which mate with splined members 27, 28 connected to shafts 8, 9 respectively. Therefore, only negligible thrust can be transmitted between lower pinion bevel gears 10, 11 and shafts 8, 9 respectively.

The upper housing 20 is firmly secured, as by bolts 29

Figure 4:
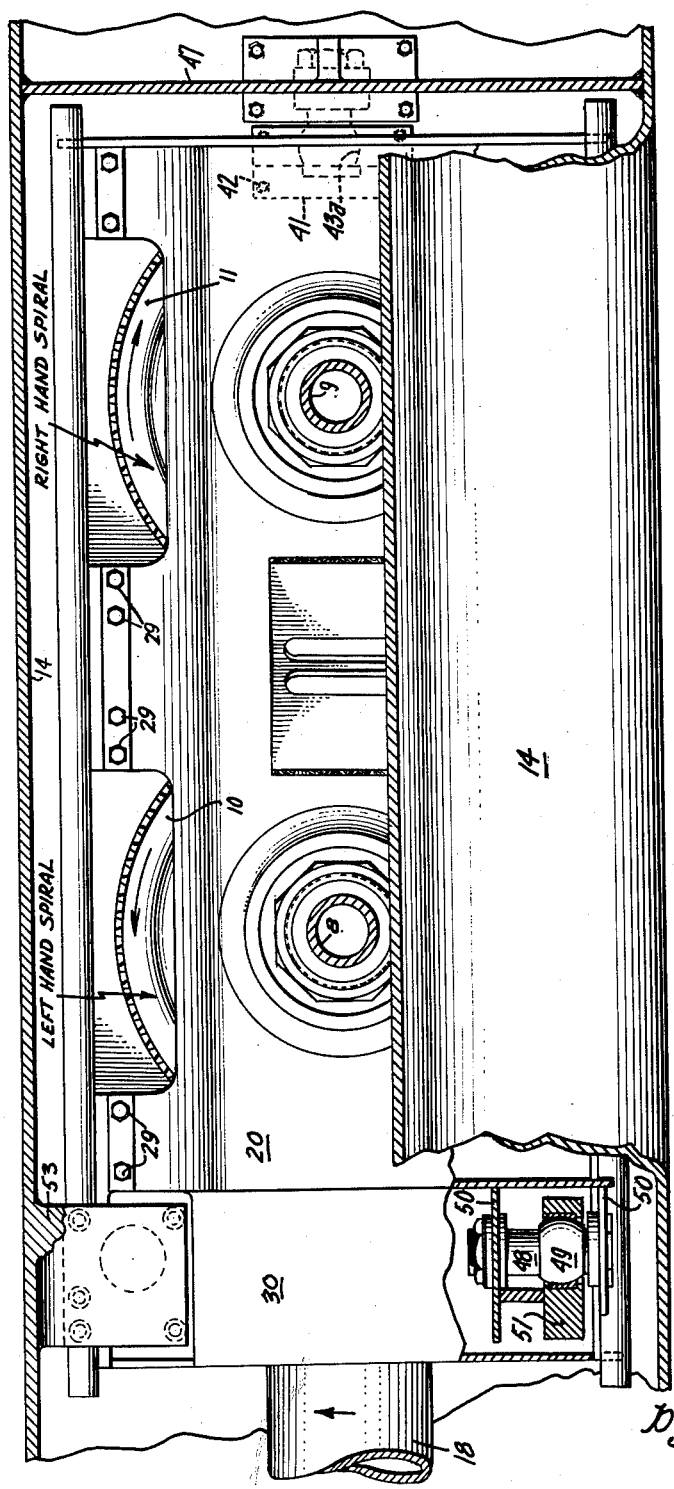
FIG. 4 is a plan view, in section, taken along lines IV—IV in FIG. 2 and showing the mounting of the gear box in the propeller pod.

(FIG. 4) to a lower rectangular housing shown generally at 30. The top of housing 30 carries two spaced sets of roller bearings 31 aligned with bearings 21, 22 above and in which are journaled the lower ends of hubs 23, 24 of the pinion gears. Therefore, the pinion gears 10, 11 are securely held in the attached housings 20, 30 and are suitably journaled to rotate therein.

Meshing with gears 10, 11 respectively are the driven spiral bevel gear rims 12, 13 mounted back-to-back and carried on a single hub 32 which includes a radial flange 33 to which the gears are attached by bolts 34. Hub 32 includes bearing surfaces 35 at either end thereof, which are journaled in bearings 36. Bearings 36 are in turn securely held in housing 30 by means of bearing support rings 37. There are also two sets of anti-friction thrust bearings 38 journaling one end of hub 32 to take care of unusual loading conditions, while the other end of hub 32 is splined by means of an attached intermediate collar 39 to a torque tube 18. Torque tube 18 is coupled to the propeller shaft (not shown). By virtue of the splined sleeve 39, negligible axial thrust is communicated between torque tube 18 and hub 32.

The entire bevel gear box 19 including housings 20, 30, together with the twin set of spiral bevel gears journaled therein, is supported in the propeller rod 14 at three points by universal ball and socket joints so that the forces and deflections which occur in the pod 14 or the strut 15 will not be communicated to the meshed gear sets. The arrangement of the three-point support structure will be seen by reference to FIGS. 2, 3 and 4 of the drawing. The forward support comprises a centerline bracket 41 attached to lower housing 30 by bolts 42. Bracket 41 holds a socket 43 with a semi-spherical bearing surface 43a. Movable within socket 43 is a ball member 44 held on a stub shaft 45 so that a limited universal movement between stub shaft 45 and bracket 41 is obtained as will be apparent from the drawing. Stub shaft 45 is securely held, as by bolting, in a bracket 46 which, in turn, is attached to structural support members 47 firmly secured to pod 14.

The two rear support points are symmetrically disposed on either side of and slightly above the propeller shaft centerline. On each of the rear supports, the stub shaft and ball member, 48, 49 respectively, are secured between lower housing framework members 50. A bracket 51 carrying a socket 52 is held securely with respect to pod 14 by means of structural support members 53.

Although in the embodiment shown the rear supports employ sockets held in the pod while the forward support employs the ball member held in the pod, it will be apparent that this is merely for convenience and that the balls and sockets can be reversed on either the forward or the rear supports. The important consideration is that the gear box 19 is held at three points, each point having provisions for slight universal movement so that gear box can move slightly when deflections in pod 14 occur, without itself undergoing any bending which would tend to misalign the bearings and thereby affect the gear meshing. Three points of support are selected, since two points of support would not fix the gear housing in space with respect to the pod, whereas four or more points of support would be redundant and thus could communicate pod deflections to the gear housing. The upper gear box containing spiral bevel gears 4–7 is held by a three-point pivotable support in the upper part of strut 15 in the same manner as pod gear box 19.

In accordance with the invention, the selection of spiral angle and direction of spiral is such that axial thrusts on both the back-to-back gears 12, 13 and the two pinion gears 10, 11 are substantially eliminated. As suggested previously, the normal nature of spiral bevel gears is such that driving and driven gears experience different amounts of axial thrust due to the spiral angle, and also such that on one gear the thrust tends to drive the teeth more firmly into mesh while the other thrust tends to push the teeth out of mesh, as in ordinary spur bevel gearing.

For example, looking from the large end of the pitch cone (or back of the gear), when the direction of spiral with respect to a pitch cone element is the same as the direction of rotation, the thrust on the driving gear is such as to force the driving gear teeth more tightly into mesh with the mating driven gear teeth. This would be in the case of a righthand gear driving clockwise or a lefthand gear driving counterclockwise. The thrust $T_1$ under this condition is expressed by the known formula: (Machinery's Handbook, Industrial Press, 11th Edition)

$$T_1 = L\left[(\tan H \cos a) - \left(\frac{\tan A \sin a}{\cos H}\right)\right]$$

where "H" is the spiral angle, "a" is the pitch cone angle, "A" is the pressure angle of the gear teeth, and "L" is the tooth load tangential to the pitch circle. These terms are well known to those skilled in the gear art and are employed in their usual sense. In the case shown, since pinion gears 10, 11 are approximately the same diameter as driven gears 12, 13, the pitch cone angle "a" is approximately 45 degrees. The tooth pressure angles A may vary, although they are generally held at certain standard angles, 14½ degrees, 17½ degrees, and 20 degrees being commonly used values. The spiral angle H depends primarily on the method of cutting the gear. Although a 35 degree spiral angle has often, although not universally, been employed, the selection of spiral angle H for the present application is quite important.

In the driven mating member, where the direction of the spiral is the same as that of the rotation, the driven gear teeth are subjected to a thrust $T_2$, tending to force the gear teeth out of mesh and away from the driving gear teeth. This would be true in the case where a right-hand gear is being driven clockwise or where a left-hand gear is being driven counterclockwise. The thrust $T_2$ may be calculated by the following known formula:

$$T_2 = L\left[(\tan H \cos a) + \left(\frac{\tan A \sin a}{\cos H}\right)\right]$$

where the symbols used are the same as before. It will be noted that the only difference between $T_1$ and $T_2$ is caused by the plus or minus sign, indicating that $T_2$ will always be of a greater magnitude than $T_1$. The existence of a minus sign in the $T_1$ formula also offers the possibility of reducing $T_1$ to zero if the quantities are selected properly.

If the direction of spiral is opposite that of the direction of rotation in both the driving and driven members, the thrusts $T_1$ and $T_2$ will be reversed and the driving gear will tend to be forced out of mesh with the greater thrust $T_2$, whereas the driven gear will tend to be forced into mesh with a lesser thrust equal to $T_1$.

In accordance with the invention, the directions of the spirals are chosen for gears 10–13 with respect to the direction of rotation, so that when gears 10–13 are turning in a direction causing forward movement of the vessel, the two pinion gears 10, 11 will experience a thrust $T_1$ (FIG. 3), tending to force them into mesh as indicated by the arrows, whereas the driven gears 12, 13 will experience the greater thrust $T_2$, tending to force them out of mesh as indicated by the arrows. For example, if pinion gear 10 is rotating counterclockwise and pinion gear 11 clockwise looking down (FIG. 4), and if the backto-back bevel gears 12, 13 are rotating clockwise looking aft, the direction of spiral on gears 10, 11, 12, 13 will be lefthand, righthand, righthand, lefthand respectively.

It will be appreciated that by selecting the larger thrusts $T_2$ to oppose one another, and since thrusts $T_2$ are caused by identical pinion gears 10, 11 turning at the same speed, and carrying the same torque loads, thrusts $T_2$ will cancel out and there will be a net zero axial thrust on the hub 32. This is true whether the propeller shaft is turning in a forward or in a reverse direction.

An additional feature of the invention is then to select the variables shown in the formulas above so that the thrusts $T_1$ are substantially zero or at least negligible when the pinion shafts are rotating in the normal or forward direction. This can most conveniently be done by selecting a given standard pressure angle "A" for the pitch cone angle "a" desired and then substituting various values of spiral angle H until the thrust $T_1$ is zero or at least negligible, or of a minimum practical value. For example, with a tooth pressure angle of 20 degrees and a pitch cone angle of 45 degrees, the proper spiral angle would be approximately 21 degrees. As a matter of fact, for the common case where the pitch cone angle equals 45 degrees, i.e., pinion diameter equals driven gear diameter, it will be found that the spiral angle H is always approximately the same as the pressure angle A for minimum thrust $T_1$. Knowing the principle, other variables can be manipulated to give negligible thrust according to the desired conditions. It will be appreciated that sometimes a small amount of thrust will be accepted due to other physical considerations such as gear wear, the machinery upon which the gear is manufactured, desired face contact ratio, scoring factor, surface durability etc.

As noted above, reversal of the direction of the driving members in spiral bevel gears will reverse the thrusts on the respective shafts. In this case, when the vessel is going astern, the pinion gears 10, 11 would be subjected to an upward thrust of magnitude $T_2$ and, for this reason, thrust bearings 21 are required on the pinion gears to take care of this necessary operating condition. However, for normal operation, the meshing spiral bevel gears experience substantially minimum thrust, and much longer life of the bearings and gear teeth is therefore possible. Reduction of spiral bevel gear thrust reactions also reduces radial reactions, thus benefitting the roller bearings in a similar manner to the thrust bearings.

It will be appreciated that minimum frontal area is a desirable characteristic to reduce water drag and aid hydrodynamic efficiency. This is best accomplished by utilizing a 1:1 ratio in the pod level gears. This results in a gear pitch angle of 45°. Other gear design considerations, such as hunting tooth action, make the choice of an approximate 1:1 ratio desirable, thus slightly modifying the pitch angle, although it will still be almost equal to 45°.

It will be appreciated that, by virtue of the splined connections between pinion shafts 8, 9 and the pinion gears, as well as the splined connection between torque tube 18 and hub 32, any thrust loads that do take place in the gears are divorced from the shafts, and these carry the load substantially in pure torque.

Any deflections experienced by strut 15 and pod 14 are communicated to gear box 19 only through the three pivoted supports with universal connections. Therefore, the gear housing will move in space with respect to the pod 14 so as to prevent bending moments from being communicated to the gear box which might tend to affect the alignment of the gear teeth.

The upper set of meshing bevel gears 4–7 driven by drive shaft 2 (see FIG. 1) is arranged in a similar manner according to the invention, except that the back-to-back bevel gears 4, 5 are the driving instead of the driven members. In this case, the hand of the spiral is selected in the manner described so that the opposed gears 4, 5 experience the greater thrust $T_2$ in opposing directions, whereas the gears 6, 7 experience the lesser thrust $T_1$. Also in a similar manner to that described in connection with the lower pinions, the variables $a$, H, and A are selected as to reduce the axial thrust on gears 6, 7 to a negligible amount.

It will be appreciated that the foregoing described arrangement is highly satisfactory for a hydrofoil vessel drive, since the vertical twin shafts 8, 9 can be aligned in a fore-and-aft direction and enclosed within the strut 15 with no greater transverse dimension than would be required by a single pinion shaft. Moreover, the manner of mounting the lower gears and upper gears in a three-point support provides a highly effective way to isolate the gear sets from the substantial movement of pod and strut which can take place in normal operation.

The aforedescribed manner of arranging the gears in a twin spiral bevel gear set with the opposed bevel gears taking the greater thrust and the mating gears taking the lesser thrust, together with the described procedure for reducing the lesser thrust to a negligible amount, greatly increases the life of the bearings and gear teeth, and allows for a more compact and lighter weight design.

While there has been described herein the preferred embodiment of the invention, it will be understood that various other changes will occur to those skilled in the art. It is, of course, intended to cover in the appended claim all such modifications and equivalents as fall within the true spirit and scope of the invention.

What I claim as new and desire to secure by Letters Patent of the United States is:

A hydrofoil drive comprising a strut, a propeller pod disposed on the lower end of said strut, upper and lower gear boxes disposed in the upper end of the strut and in said pod respectively, said gear boxes each being mounted on three pivotable supports whereby deflections in the strut and pod cause the gear boxes to adjust their positions relative thereto without transmitting deflections to the gear boxes, first and second spiral bevel gears mounted coaxially back-to-back on a common shaft and rotatably journaled in said upper gear box, third and fourth spiral bevel gears meshed with the first and second gears respectively, and rotatably journaled in the upper gear box along spaced parallel vertical axes, fifth and sixth spiral bevel gears rotatably journaled in the lower gear box along spaced parallel vertical axes and coaxial with the third and fourth gears respectively, a pair of vertical shafts coupling the third gear with the fifth gear and the fourth gear with the sixth gear, seventh and eighth spiral bevel gears mounted coaxially back-to-back and rotatably journaled in the lower gear box to mesh with said fifth and sixth gears respectively, means driving the first and second gears, and propeller means driven by the seventh and eighth gears.

References Cited in the file of this patent

UNITED STATES PATENTS

| | | |
|---|---|---|
| 1,753,722 | Schaum | Apr. 8, 1930 |
| 1,990,606 | Junkers | Feb 12, 1935 |
| 2,479,119 | Johnson | Aug. 16, 1949 |

OTHER REFERENCES

Gleason Works, "Bevel and Hypoid Gear Design," p. 31–34 and Design Chart #6. Copyright 1947.